United States Patent
Sengupta et al.

(10) Patent No.: US 10,376,833 B2
(45) Date of Patent: Aug. 13, 2019

(54) PROCESS FOR CAPTURING CARBON-DIOXIDE FROM A GAS STREAM

(71) Applicant: RELIANCE INDUSTRIES LIMITED, Mumbai, Maharashtra (IN)

(72) Inventors: Surajit Sengupta, West Bengal (IN); Vinay Amte, Chhattisgarh (IN); Asit Kumar Das, Gujarat (IN); Satyanarayana Reddy Akuri, Andhra Pradesh (IN); Manoj Yadav, Haryana (IN); Sukumar Mandal, Haryana (IN); Amit Gohel, Gujarat (IN); Sampath Nerivetla, Telangana (IN); Kalyan Chandra Nath, Assam (IN)

(73) Assignee: RELIANCE INDUSTRIES LIMITED, Mumbai, Maharashtra (IN)

( * ) Notice: Subject to any disclaimer, the term of this patent is extended or adjusted under 35 U.S.C. 154(b) by 0 days.

(21) Appl. No.: 15/574,965

(22) PCT Filed: May 18, 2016

(86) PCT No.: PCT/IB2016/052880
§ 371 (c)(1),
(2) Date: Nov. 17, 2017

(87) PCT Pub. No.: WO2016/185387
PCT Pub. Date: Nov. 24, 2016

(65) Prior Publication Data
US 2018/0169574 A1 Jun. 21, 2018

(30) Foreign Application Priority Data
May 19, 2015 (IN) .......................... 1963/MUM/2015

(51) Int. Cl.
*B01D 53/62* (2006.01)
*B01D 53/12* (2006.01)
(Continued)

(52) U.S. Cl.
CPC ............. *B01D 53/62* (2013.01); *B01D 53/96* (2013.01); *B01J 20/043* (2013.01); *B01J 20/08* (2013.01);
(Continued)

(58) Field of Classification Search
None
See application file for complete search history.

(56) References Cited

FOREIGN PATENT DOCUMENTS
JP 3853398 B2 12/2006

OTHER PUBLICATIONS

International Search Report of PCT/IB2016/052880, dated Jul. 4, 2016.
(Continued)

*Primary Examiner* — Daniel Berns
(74) *Attorney, Agent, or Firm* — Collard & Roe, P.C.

(57) ABSTRACT

The present disclosure relates to a process for capturing carbon-dioxide from a gas stream. In order to capture the carbon-dioxide, a support is provided and potassium carbonate ($K_2CO_3$) is impregnated thereon to form an adsorbent comprising potassium carbonate ($K_2CO_3$) impregnated support. The adsorbent is activated to form an activated adsorbent. The gas stream is passed through the adsorber to enable adsorption of the carbon-dioxide on the activated adsorbent to form a carbon-dioxide laden adsorbent. The carbon-dioxide laden adsorbent is transferred to a desorber for at least partially desorbing the carbon-dioxide from the carbon-dioxide laden adsorbent by passing a carbon-dioxide deficient stream through the desorber. The partially regenerated adsorbent is returned to the adsorber for adsorbing the carbon-dioxide from the carbon-dioxide. The process of the present disclosure reduces the overall energy demand by partially regenerating the adsorbent.

8 Claims, 10 Drawing Sheets

(51) Int. Cl.
- *B01D 53/80* (2006.01)
- *B01D 53/81* (2006.01)
- *B01D 53/96* (2006.01)
- *B01J 20/04* (2006.01)
- *B01J 20/08* (2006.01)
- *B01J 20/16* (2006.01)
- *B01J 20/28* (2006.01)
- *B01J 20/32* (2006.01)
- *B01J 20/34* (2006.01)

(52) U.S. Cl.
CPC ......... *B01J 20/16* (2013.01); *B01J 20/28061* (2013.01); *B01J 20/28064* (2013.01); *B01J 20/28069* (2013.01); *B01J 20/3204* (2013.01); *B01J 20/3225* (2013.01); *B01J 20/3236* (2013.01); *B01J 20/3433* (2013.01); *B01J 20/3458* (2013.01); *B01D 53/12* (2013.01); *B01D 2251/306* (2013.01); *B01D 2251/606* (2013.01); *B01D 2253/104* (2013.01); *B01D 2253/106* (2013.01); *B01D 2253/112* (2013.01); *B01D 2253/304* (2013.01); *B01D 2257/504* (2013.01); *B01D 2258/06* (2013.01); *B01D 2259/4009* (2013.01); *Y02A 50/2342* (2018.01); *Y02C 10/04* (2013.01); *Y02C 10/08* (2013.01)

(56) References Cited

OTHER PUBLICATIONS

Hoffman, James S. et al. "Study of Regenerable Sorbents for $CO_2$ Capture." National Energy Technology Laboratory, Pittsburgh, PA (United States); Conference: National Conference on Carbon Sequestration, Washington DC, (United States), May 15-17, 2001, 11 pages.

Veselovskaya, Janna V. et al. "Direct $CO_2$ capture from ambient air by $K_2CO_3$/alumina composite sorbent for synthesis of renewable methane." Renewable Bioresources, vol. 3, Article 1, 7 pages.

PROCESS FOR CAPTURING CARBON-DIOXIDE FROM A GAS STREAM

CROSS REFERENCE TO RELATED APPLICATION

This application is the National Stage of PCT/IB2016/052880 filed on May 18, 2016, which claims priority under 35 U.S.C. § 119 of Indian Application No. 1963/MUM/2015 filed on May 19, 2015, the disclosures of which are incorporated by reference. The international application under PCT article 21(2) was published in English.

FIELD

The present disclosure relates to a process for capturing carbon-dioxide from a gas stream.

BACKGROUND

The atmospheric carbon-dioxide ($CO_2$) levels are increasing continuously due to rapid industrial growth. Major industrial sites like thermal power plants, oil refineries, and other processing plants such as cement, steel, aluminum, and the like cause most of the carbon-dioxide ($CO_2$) emission into the environment. The increased level of atmospheric carbon-dioxide ($CO_2$) is considered to be one of the main causes for global warming. In order to combat global warming, several precautionary measures are required. The precautionary measures include the use of low carbon or carbon free energy sources like nuclear and wind, and other alternative methods such as capture and sequestration of carbon-dioxide ($CO_2$).

Various conventional processes such as absorption, adsorption, membrane separation cryogenic separation, and the like can be used for capturing carbon-dioxide ($CO_2$). From the afore-stated conventional processes, the adsorption process is advantageous due to its enhanced carbon-dioxide ($CO_2$) capture capacity, lower regeneration energy, and low operational cost which provide easy retrofit to existing systems.

The adsorption process is carried out in the presence of an adsorbent, and the efficiency of the adsorption process is dependent upon a composition of the adsorbent used.

However, there are certain limitations associated with the conventional adsorption process, for example:
poor multi-cycle adsorption capacity;
requires high regeneration temperature for decomposing the stable intermediate species (for example $KAl(CO_3)_2(OH)_2$) formed on the surface of the adsorbent during the adsorption of carbon-dioxide ($CO_2$); thereby increasing the overall energy demand of the adsorption process; and
the efficiency of removal/capture of carbon-dioxide ($CO_2$) from a gas stream decreases with every cycle of regeneration of the adsorbent.

There is, therefore, felt a need for an alternative to capture carbon-dioxide ($CO_2$) from a gas stream and obviate the above mentioned drawbacks.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to capture carbon-dioxide ($CO_2$) from a gas stream.

Another object of the present disclosure is to provide a process for capturing carbon-dioxide ($CO_2$) that offers a lower differential temperature between adsorption and desorption, thereby minimizing the overall energy demand.

Still another object of the present disclosure is to provide a process for capturing carbon-dioxide ($CO_2$) that regenerates the adsorbents partially.

Yet another object of the present disclosure is to provide a process for capturing carbon-dioxide ($CO_2$) that increases the life of the adsorbents.

Still another object of the present disclosure is to provide a process for capturing carbon-dioxide ($CO_2$) from a gas stream, which is simple and cost-effective.

Other objects and advantages of the present disclosure will be more apparent from the following description, which is not intended to limit the scope of the present disclosure.

SUMMARY

The present disclosure relates to a process for capturing carbon-dioxide from a gas stream. The process comprises the steps described herein below.

A support is provided, wherein the support can be one of an alumina support and a silica alumina support. Potassium carbonate ($K_2CO_3$) is impregnated on the support to form an adsorbent comprising potassium carbonate ($K_2CO_3$) impregnated support. The adsorbent is activated in an adsorber by passing one of water-vapor and the gas stream comprising water-vapor at a temperature ranging from 40° C. to 80° C., at a pressure ranging from 1 bar to 2 bar, and for a time period ranging from 1 minute to 20 minutes to form an activated adsorbent with active adsorption sites having reduced energies. The gas stream is passed through the adsorber containing the activated adsorbent to enable adsorption of the carbon-dioxide from the gas stream on the activated adsorbent at a temperature ranging from 40° C. to 90° C. and at a pressure ranging from 1 bar to 2 bar to form a carbon-dioxide laden adsorbent. The carbon-dioxide laden adsorbent is transferred to a desorber and a carbon-dioxide deficient stream is passed there through for at least partially desorbing the carbon-dioxide from said carbon-dioxide laden adsorbent at a temperature ranging from 110° C. to 200° C. and at a pressure ranging from 1 bar to 2 bar to obtain a partially regenerated adsorbent. The partially regenerated adsorbent is returned to the adsorber for the adsorption of the carbon-dioxide from the gas stream.

The carbon-dioxide deficient stream can be at least one selected from the group consisting of nitrogen, carbon-dioxide, and water-vapor.

The support can be characterized by a surface area, pore volume, and pore size that can be in the range of 170 to 550 $m^2/g$, 0.18 $cm^3/g$ to 0.95 $cm^3/g$, and 100 Å to 300 Å, respectively.

The activated adsorbent can be hydrated $K_2CO_3$.

The amount of $K_2CO_3$ in the support can be in the range of 5 wt % to 60 wt %.

The process step of adsorption is carried out in the adsorber and the process step of desorption is carried out in the desorber in a circulating fluidized bed bubbling flow regime.

The differential temperature between the process step of adsorption and the process step of desorption can be in the range of 20° C. to 110° C.

The residence time of the activated adsorbent in the adsorber can be in the range of 1 minute to 10 minutes; and The residence time of the carbon-dioxide laden adsorbent in the desorber can be in the range of 1 minute to 5 minutes.

The pressure difference between the adsorber and the desorber ranges from 80 mm $H_2O$ to 150 mm $H_2O$, typically 100 mm $H_2O$.

The efficiency of carbon-dioxide removal from the gas stream can be in the range of 40% to 90%.

BRIEF DESCRIPTION OF THE ACCOMPANYING DRAWING

A process for capturing carbon-dioxide from a gas stream will now be described with the help of the accompanying drawing, in which.

DETAILED DESCRIPTION

As described herein above, following are the drawbacks associated with a conventional adsorption process:
multi-cycle adsorption capacity is poor;
high regeneration temperature is required for decomposing the stable intermediate species (for example $KAl(CO_3)_2(OH)_2$) formed on the surface of the adsorbent during the adsorption of carbon-dioxide ($CO_2$), thereby increasing the overall energy demand of the adsorption process; and
carbon-dioxide ($CO_2$) removal/capture efficiency from a gas stream is decreased with every cycle of regeneration of an adsorbent used in the adsorption process.

The present disclosure, therefore, envisages a process for capturing carbon-dioxide from a gas stream and obviating the above mentioned drawbacks.

Figure 1A:
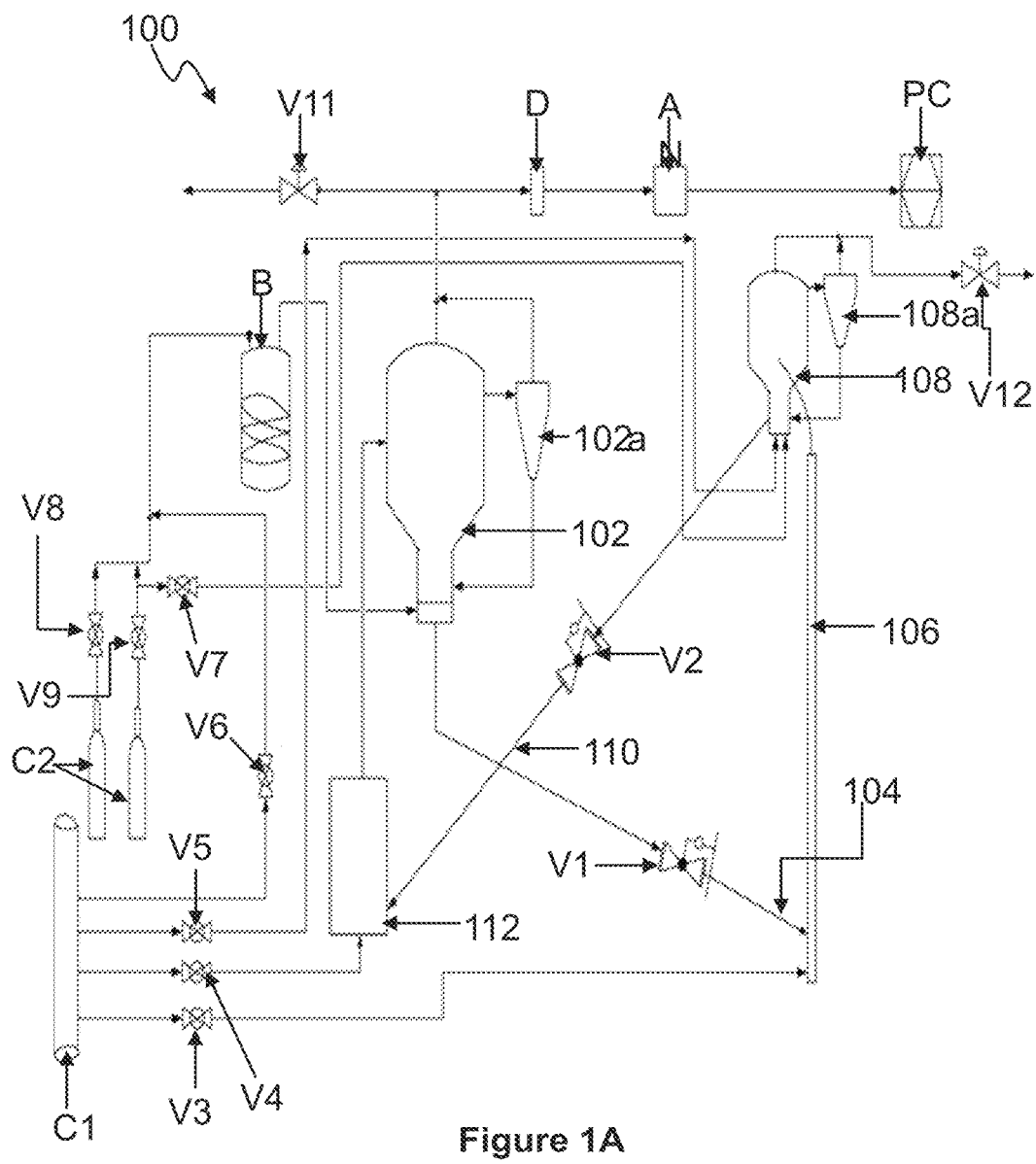
FIGS. 1A and 1B illustrate a system for capturing carbon-dioxide ($CO_2$) from a gas stream in accordance with the present disclosure.
Figure 1B:
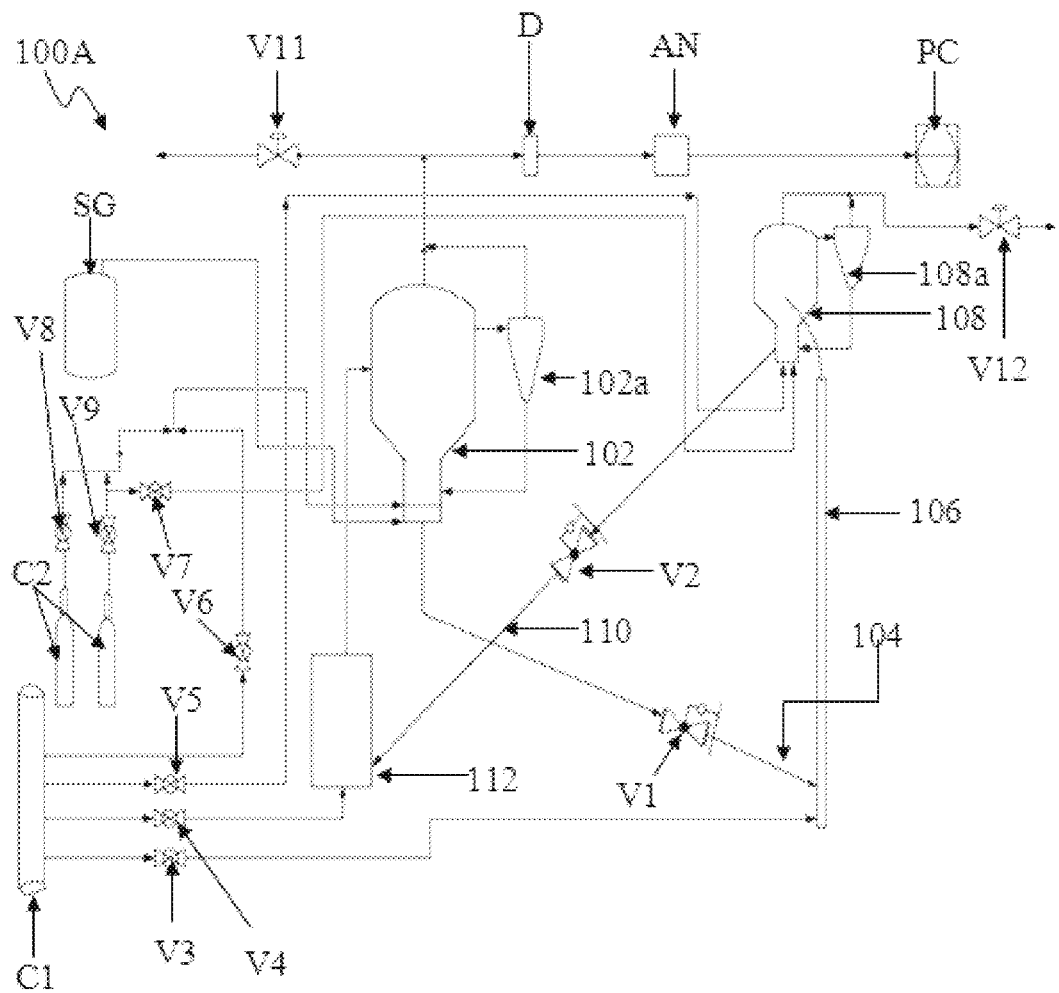

The process is carried out in a system (100, 100A) depicted in FIGS. 1A and 1B. The system (100, 100A) includes an adsorber (102), a first cyclone separator (102a), a first standpipe (104), a riser (106), a desorber (108), a second cyclone separator (108a), a second standpipe (110), a conduit vessel (112), a first cylinder (C1), a plurality of second cylinder (C2), a bubbler (B), a dryer (D), an analyzer (IR analyzer) (AN), and a computer (PC).

In order to capture the carbon-dioxide from the gas stream, a support is provided. The support can be one of an alumina support and a silica alumina support. The surface area, pore volume, and pore size of the support can be in the range of 170 $m^2/g$ to 550 $m^2/g$, 0.18 $cm^3/g$ to 0.95 $cm^3/g$, and 100 Å to 300 Å, respectively. Potassium carbonate ($K_2CO_3$) is then impregnated on the support to form an adsorbent comprising potassium carbonate ($K_2CO_3$) impregnated support.

In accordance with one embodiment, the alumina or silica alumina support having a ratio of silica and alumina between 80:20 and 10:90 is used. The silica alumina support is treated at a temperature in the range of 550° C. to 1100° C., i.e., the support is calcined at a temperature in the range of 900° C. to 1000° C. or is treated hydrothermally with steam at a temperature in the range of 700° C. to 800° C. before impregnating $K_2CO_3$ to form a pre-treated or stabilized silica alumina support. The pre-treated support is added to a fluid medium (distilled water) comprising $K_2CO_3$ in the range between 35 wt % to 56 wt %, and $K_2CO_3$ is allowed to disperse on the pre-treated support for a time period in the range of 10 min to 20 min using an incipient wet impregnation method at a temperature in the range of 20° C. to 50° C. to form the adsorbent followed by drying at a temperature in the range of 100° C. to 150° C. for at a time period in the range of 10 hours to 12 hours. The adsorbent can be crushed and sieved using mesh size of 180 micron and 45 micron.

Before activating the adsorbent in the adsorber (102), it is necessary to stabilize the temperature inside the adsorber (102) and the desorber (108). The temperature inside the adsorber (102) and the desorber (108) is stabilized by circulating the adsorbent without injecting the carbon-dioxide ($CO_2$) and water-vapor/steam ($H_2O$) in the adsorber (102) and the desorber (108).

After stabilization of the temperature, it is necessary to activate the adsorbent, so as to facilitate the adsorption of the carbon-dioxide ($CO_2$) on the adsorbent. The adsorbent is activated in the adsorber (102) by passing one of water-vapor and the gas stream comprising water-vapor at a temperature ranging from 40° C. to 80° C., at a pressure ranging from 1 bar to 2 bar, and for a time period ranging from 1 minute to 20 minutes to form an activated adsorbent with active adsorption sites having reduced energies.

The adsorbent can be activated by passing one of water-vapor and the gas stream comprising water-vapor using the bubbler (B).

The residence time of the activated adsorbent in the adsorber (102) can be in the range of 1 minute to 10 minutes.

An adsorbent comprising $Na_2CO_3$ impregnated support can be used instead of $K_2CO_3$. However, $K_2CO_3$ is preferred alkali metal carbonate, because, equilibrium temperature of $K_2CO_3$ is much higher than $Na_2CO_3$. Due to this, $K_2CO_3$ have higher potential than $Na_2CO_3$ to enable adsorption of the carbon-dioxide ($CO_2$) at higher temperatures.

The amount of $K_2CO_3$ in the support can be in the range of 5 wt % to 60 wt %.

The activated adsorbent can be hydrated $K_2CO_3$. The step of formation of the hydrated $K_2CO_3$ is depicted by the following reaction:

$$K_2CO_3 + H_2O \rightarrow \text{hydrated } K_2CO_3$$

The reaction mentioned herein-above is exothermic, due to which the amount of energy released on the formation of hydrated $K_2CO_3$ is approximately 103 kJ/mol.

Due to the formation of the hydrated $K_2CO_3$, water molecules are adsorbed on some of the active energetic sites available for the adsorption of the carbon-dioxide ($CO_2$) on the adsorbent, thereby reducing the overall active energetic sites present on the adsorbent for the adsorption of the carbon-dioxide ($CO_2$).

After the formation of the hydrated $K_2CO_3$, the gas stream is passed through the adsorber (102) containing the activated adsorbent to enable the adsorption of the carbon-dioxide ($CO_2$) on the activated adsorbent at a temperature ranging from 40° C. to 90° C. and at a pressure ranging from 1 bar to 2 bar to form a carbon-dioxide laden adsorbent (i.e. alkali metal hydrogen carbonate ($KHCO_3$)). The formation of $KHCO_3$ is depicted by the following reaction:

$$\text{Hydrated } K_2CO_3 + CO_2 \rightarrow 2KHCO_3 + xH_2O$$

(where, x ranges from 0.1 to 1)

The reaction mentioned herein-above is exothermic, due to which the amount of energy released on the formation of $KHCO_3$ is approximately 38 kJ/mol.

In accordance with the present disclosure, if the adsorbent is not activated, $K_2CO_3$ impregnated support will not react with the carbon-dioxide ($CO_2$) to form $KHCO_3$.

The gas stream leaving the adsorber (102) after the adsorption of the carbon-dioxide ($CO_2$) is fed to the analyzer (AN) via the dryer (D). The results obtained from the analyzer (AN) can be seen on the computer (PC).

The flow of the gas stream leaving the adsorber (102) can be controlled by a valve (V11).

In accordance with the present disclosure, the gas stream leaving the adsorber (102) is a treated gas.

Before transferring the carbon-dioxide laden adsorbent to the desorber (108), it is necessary to collect the carbon-dioxide laden adsorbent entrained in the gas stream leaving the adsorber (102). Therefore, the gas stream leaving the adsorber (102) is passed through the first cyclone separator (102a) to remove the carbon-dioxide laden adsorbent entrained therein and return or collect the carbon-dioxide laden adsorbent in the adsorber (102).

After collecting the carbon-dioxide laden adsorbent in the adsorber (102), the carbon-dioxide laden adsorbent is transferred to the desorber (108) via the first standpipe (104) and the riser (106).

The flow of the carbon-dioxide ($CO_2$) laden adsorbent in the desorber (108) can be controlled by a valve (V1).

A carbon-dioxide deficient stream, which can be at least one selected from the group consisting of nitrogen, carbon-dioxide, and water-vapor, is passed through an operative bottom portion of the desorber (108) to at least partially desorb the carbon-dioxide ($CO_2$) from the carbon-dioxide laden adsorbent at a temperature ranging from 110° C. to 200° C. and at a pressure ranging from 1 bar to 2 bar to obtain a partially regenerated adsorbent. The circulation of the carbon-dioxide deficient stream in the system (100, 100A) can be controlled by valves V3, V4, V5, V6, V7, V8 and V9.

The carbon-dioxide ($CO_2$) desorption from the carbon-dioxide laden adsorbent can be increased by increasing the residence of the carbon-dioxide laden adsorbent in the desorber (108).

The residence time of the carbon-dioxide laden adsorbent in the desorber (108) can be in the range of 1 minute to 5 minutes.

In accordance with one embodiment of the present disclosure, the carbon-dioxide ($CO_2$) can be passed through the desorber (108) to at least partially desorb the carbon-dioxide ($CO_2$) from the carbon-dioxide laden adsorbent to obtain the partially regenerated adsorbent. Due to this, the use of nitrogen ($N_2$) for regenerating the adsorbent can be obviated, thereby reducing the operating cost of the process. This is because, with the use of the carbon-dioxide ($CO_2$), a need for product purification can be obviated.

The flow of the desorbed carbon-dioxide ($CO_2$) leaving the desorber (108) can be controlled by a valve (V12). The partially regenerated adsorbent may be entrained in the desorbed carbon-dioxide ($CO_2$) leaving the desorber (108). Therefore, in order to remove or separate the entrained partially regenerated adsorbent, the desorbed carbon-dioxide ($CO_2$) is passed through the second cyclone separator (108a). The separated partially regenerated adsorbent is collected in the desorber (108). From the desorber (108), the partially regenerated adsorbent is returned to the adsorber (102) via the second standpipe (110) and the conduit vessel (112). The flow of the partially regenerated adsorbent to the adsorber (102) can be controlled by a valve (V2).

The flow of the carbon-dioxide ($CO_2$) laden adsorbent in the desorber (108) and the flow of the partially regenerated adsorbent in the adsorber (102) can be controlled by:

the valves (V1) and (V2) respectively; and maintaining a stable pressure equivalence between the adsorber (102) and the desorber (108) (i.e., the pressure difference between the adsorber (102) and the desorber (108) typically is maintained at 100 mm $H_2O$).

In order to maintain a constant fluidized bed height in the adsorber (102) and the desorber (108), it is necessary to control the flow of the carbon-dioxide ($CO_2$) laden adsorbent in the desorber (108) and the partially regenerated adsorbent in the adsorber (102).

In accordance with the present disclosure, the adsorbent inside the adsorber (102) and the carbon-dioxide laden adsorbent in the desorber (108) is fluidized in a circulating bubbling flow regime.

Particularly, partial regeneration of the adsorbent is preferred. This is because; less temperature is required for the partial regeneration of the adsorbent as compared to that required for the complete regeneration of the adsorbent. Further, the partial regeneration of the adsorbent retains water of crystallization (hydrated species) on the adsorbent, thereby reducing the activation energy required for adsorbing the carbon-dioxide ($CO_2$), and eliminating the requirement of higher temperature for adsorbing the carbon-dioxide ($CO_2$) from the gas stream. Hence, the adsorption of the carbon-dioxide ($CO_2$) can be carried out at a lower temperature (i.e., in the range of 40° C. to 90° C.).

Moreover, the retention of water of crystallization facilitates in retaining active adsorption sites having reduced energies on the adsorbent; and using lower ratio of water-vapor ($H_2O$) and carbon-dioxide ($CO_2$) in the gas stream for activating the adsorbent.

Thus, due to the partial regeneration and reduced activation energy, the overall energy demand required for the adsorption and desorption of the carbon-dioxide ($CO_2$) is reduced.

Using the process of the present disclosure, the efficiency of the carbon-dioxide ($CO_2$) removal from the gas stream can be in the range of 40% to 90%.

The present disclosure is further described in light of the following experiments which is set forth for illustration purpose only and not to be construed for limiting the scope of the disclosure. The following pilot scale experiments can be scaled up to industrial/commercial scale.

EXPERIMENTAL DETAILS

Experiments

Process for Capturing Carbon-dioxide ($CO_2$) from the Gas Stream

Silica-alumina supports having silica and alumina in the ratio between 80:20 and 10:90, preferably 40:60 to 20:80 were calcined at a temperature of 950° C. or were treated hydrothermally with steam at a temperature of 760° C. before impregnating with $K_2CO_3$ to form pre-treated or stabilized silica-alumina supports. Similarly, alumina support was also pretreated using calcination at 950° C. to produce stabilized alumina support. The stabilized silica-alumina supports were added into distilled water comprising $K_2CO_3$ and $K_2CO_3$ was allowed to disperse on the stabilized alumina or silica-alumina supports for 15 min using an incipient wet impregnation method at a temperature of 30° C. to form adsorbents followed by drying at 120° C. for 15 hours. The stabilized silica-alumina supports were loaded with 50 wt % to 56 wt % $K_2CO_3$ because of higher pore volume of the stabilized silica-alumina supports, while 35 wt % $K_2CO_3$ was loaded on stabilized alumina.

Figure 2:
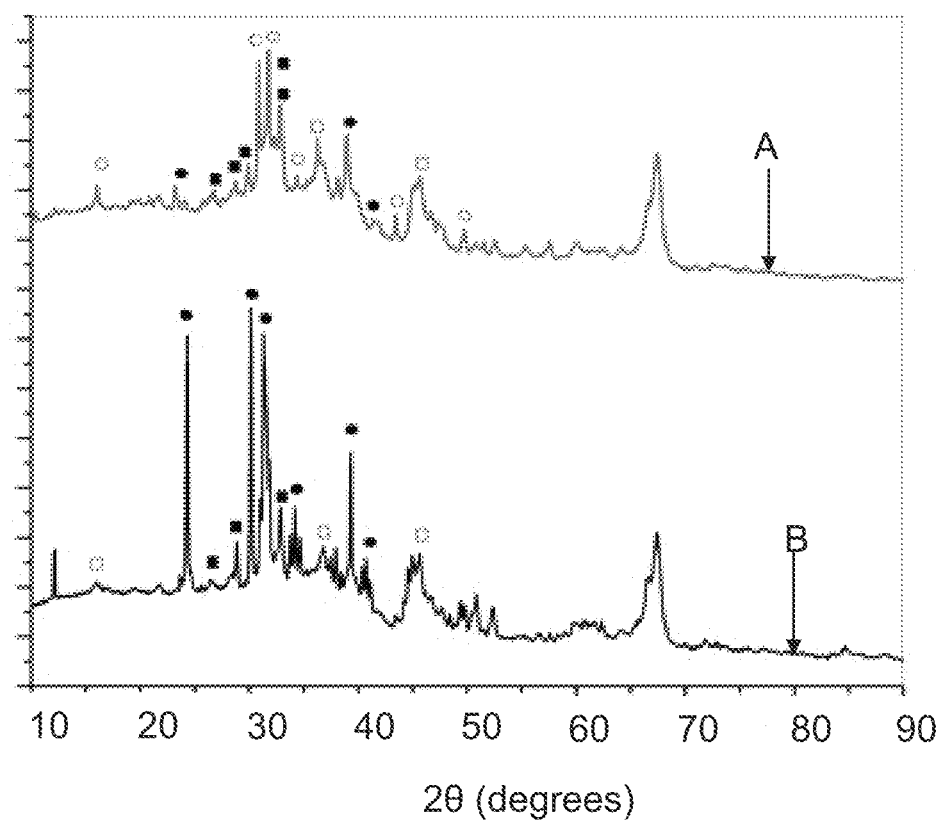
FIG. 2 illustrates the X-Ray Diffraction (XRD) pattern of an activated adsorbent and a partially regenerated adsorbent in accordance with the present disclosure.

The adsorbents produced from the above mentioned process were further crushed and sieved using mesh size of 180 micron and 45 micron. 25 kg of 35 wt % $K_2CO_3$ adsorbent impregnated on stabilized alumina supports was charged into the adsorber (102). A gas stream, containing water-vapor ($H_2O$) and carbon-dioxide ($CO_2$) in the ratio equal to 1.91, was introduced into the adsorber (102) with a velocity of 0.11 m/s and for a time period of 7.5 minutes. The flow of the gas stream in the adsorber (102) was co-current to the flow of the adsorbent in the adsorber (102). Due to the presence of water-vapor ($H_2O$), the adsorbent was activated to form an activated adsorbent (hydrated $K_2CO_3$). The activated adsorbent was reacted with the carbon-dioxide ($CO_2$) at a temperature of 70° C., and at a pressure of 1.75 bar to adsorb the carbon-dioxide ($CO_2$) and obtain a carbon-dioxide laden adsorbent. The carbon-dioxide laden adsorbent comprises $K_2CO_3$. 1.5 $H_2O$ and $KHCO_3$ (represented by curve B in FIG. 2). The residence time of the activated adsorbent in the adsorber (102) was 7.5 minutes. The gas stream leaving the adsorber (102) (i.e., treated gas) was passed through the first cyclone separator (102a) to separate/remove carbon-dioxide ($CO_2$) laden adsorbent from the treated gas. The carbon-dioxide laden adsorbent was then transferred to the desorber (108). A fluid ($N_2$) was passed through the desorber (108) to partially desorb the carbon-dioxide ($CO_2$) from the carbon-dioxide laden adsorbent at a temperature of 150° C. and at a pressure of 1.80 bar to form a partially regenerated adsorbent. The partially regenerated adsorbent retained the hydrated species (represented by curve A in FIG. 2). The residence time of the carbon-dioxide laden adsorbent in the desorber (108) was 3.5 minutes, and the velocity at which the fluid was introduced into the desorber (108) was 0.7 m/s.

Figure 3:
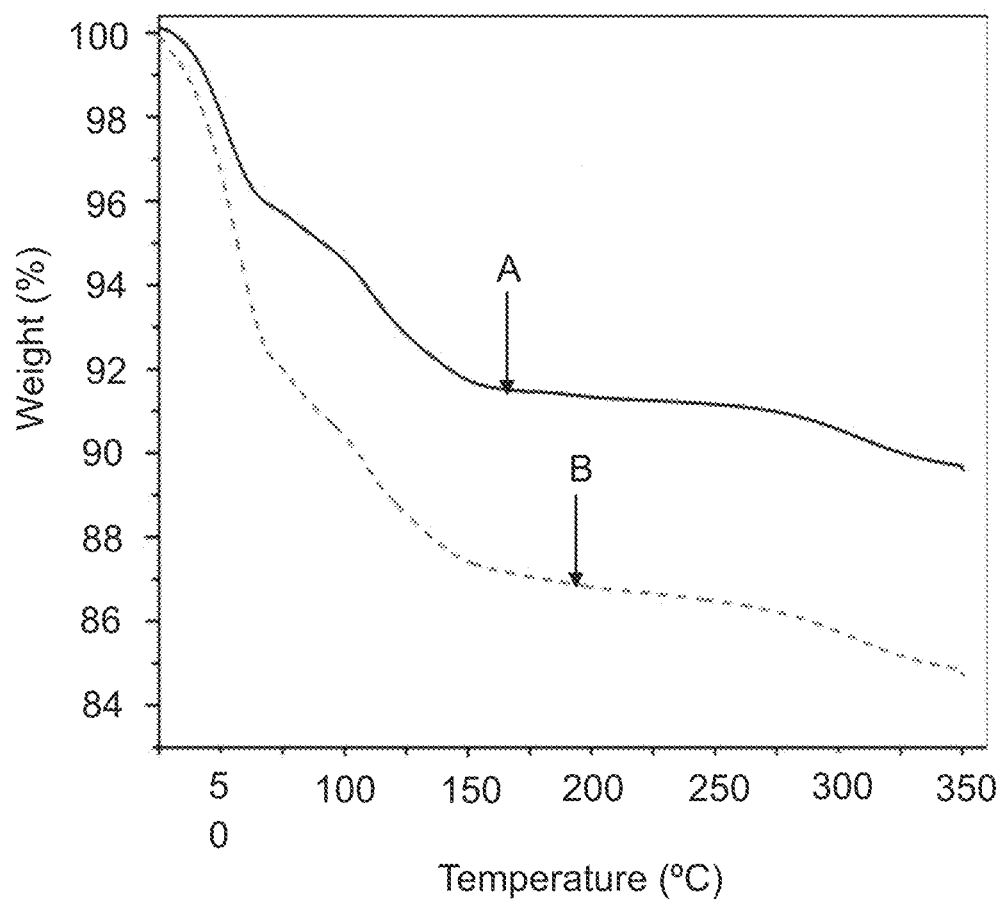
FIG. 3 is a graph of variation in weight % of a partially regenerated adsorbent and a carbon-dioxide ($CO_2$) laden adsorbent versus variation in temperature in accordance with the present disclosure.

During the partial regeneration, losses due to decomposition of the hydrated $K_2CO_3$ species and $KHCO_3$ were observed by thermo gravimetric analysis (TGA). The results obtained by TGA are illustrated in FIG. 3. From FIG. 3, it is found that, weight loss of the partially regenerated adsorbent (represented by curve A) was approximately 2.15 weight % with respect to the carbon-dioxide laden adsorbent (represented by curve B).

Figure 4:
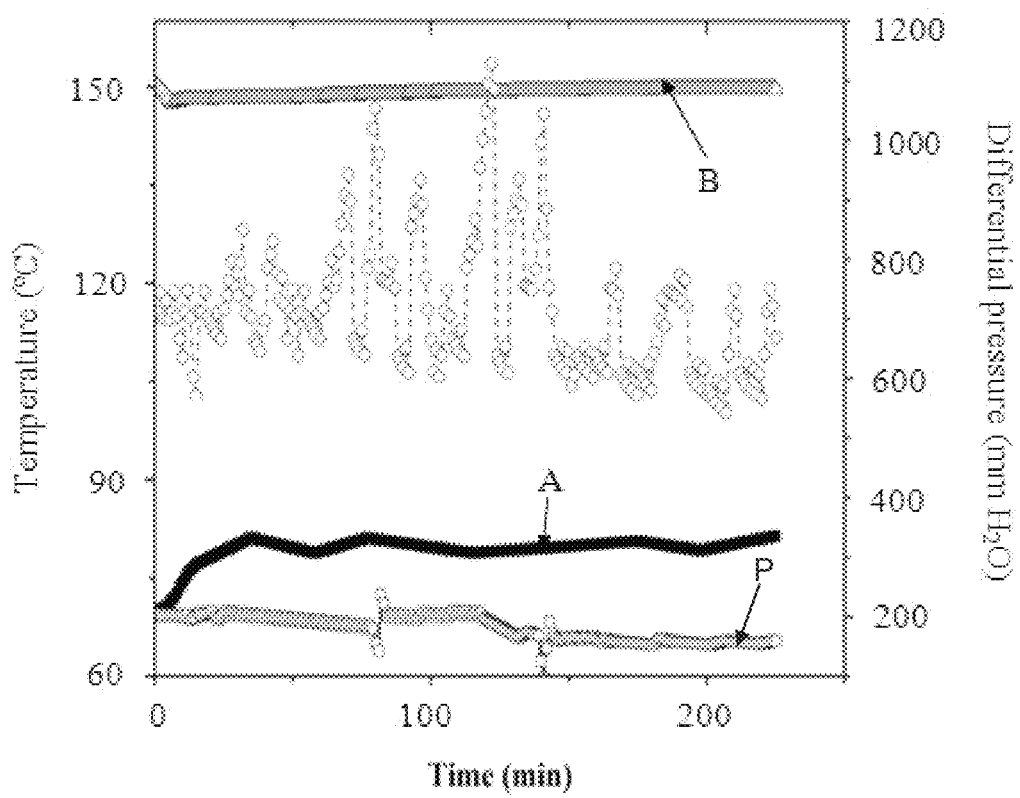
FIG. 4 is a graph depicting variation in differential pressure between an adsorber and a desorber with time and variation in temperature of the adsorber and the desorber with time in accordance with the present disclosure.

Further, in order to have continuous recirculation of the adsorbent between the adsorber (102) and the desorber (108), it is necessary to maintain a stable differential pressure of 100 mm $H_2O$ (represented by curve P of FIG. 4) between the adsorber (102) and the desorber (108). During the process step of adsorption, temperature ranges from 68° C. to 85° C. (represented by curve A in FIG. 4) and during the process step of desorption, temperature remains constant (i.e., 150° C., which is represented by curve B in FIG. 4).

After each run, the analysis of the gas stream leaving the adsorber (102) was done by the IR analyzer (AN) to identify the composition of the gas stream. Further, for every run, carbon-dioxide ($CO_2$) removal efficiency (%) can be calculated by the following equation:

$$CO_2 \text{ removal efficiency} = \frac{(C_{CO_{2in}} - C_{CO_{2out}}) \times 100}{C_{CO_{2in}}}$$

Wherein, $C_{CO2in}$—inlet concentration of the carbon-dioxide ($CO_2$) in (vol %); and $C_{CO2out}$—outlet concentration of the carbon-dioxide ($CO_2$) in vol %.

Further, residence time of the gas stream ($t_{gas}$ in seconds) and the adsorbent ($t_{solid}$ in minutes) in the adsorber (102) and the desorber (108) can be calculated by the following equation:

$$t_{gas} = \frac{V_{Adsorber \, or \, Desorber}}{v_{Adsorber \, or \, Desorber}} \times 3600$$

$$t_{solid} = \frac{W_{solid}}{CMCR} \times 60$$

Wherein, $V_{Adsorber \, or \, Desorber}$—volume of the adsorber (102) and the desorber (108) in ($m^3$);

$v_{Adsorber \, or \, Desorber}$—volumetric flow-rate of the gas stream and the fluid in ($m^3$/h) in the adsorber (102) and the desorber (108) respectively;

$W_{solid}$—weight of the adsorbent in (kg); and

CMCR—circulation rate of the adsorbent in (kg/h).

Experiment 1

Effect of Different Velocities of the Gas Stream

The process described in the above mentioned experiments was carried out with different gas velocities such as 0.06 m/s, 0.08 m/s and 0.11 m/s having constant water-vapor ($H_2O$)/carbon-dioxide ($CO_2$) ratio (equal to 1.6). The effect of these velocities on the removal of carbon-dioxide ($CO_2$) in percentage is illustrated in FIG. 5.

Figure 5:
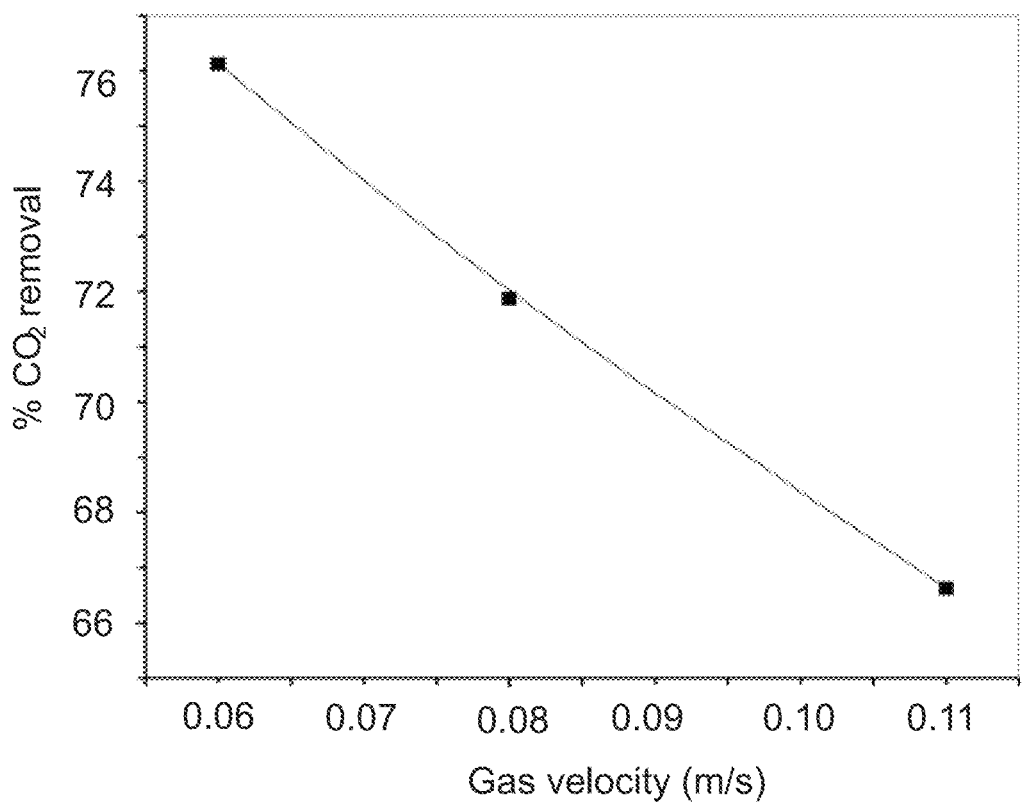
FIG. 5 is a graph of variation in carbon-dioxide ($CO_2$) removal (in percentage) versus variation in gas stream velocity (m/s) in accordance with the present disclosure.

FIG. 5 depicts that the removal of carbon-dioxide ($CO_2$) from the gas stream having velocity equal to 0.06 m/s is 76.6%, while it reduced to 66.7% at 0.11 m/s.

Inference—

From FIG. 5, it can be inferred that, with increase in the velocity of the gas stream entering the adsorber (102), the removal of carbon-dioxide ($CO_2$) from the gas stream is reduced due to decrease in gas-adsorbent contact time.

Experiment 2

Effect of Different Desorption Temperatures

The process described in the above mentioned experiments was carried out with different desorption temperatures such as 130° C., 150° C., and 200° C. The effect of these desorption temperatures on the removal of carbon-dioxide ($CO_2$) in percentage is illustrated in FIG. 6.

Figure 6:
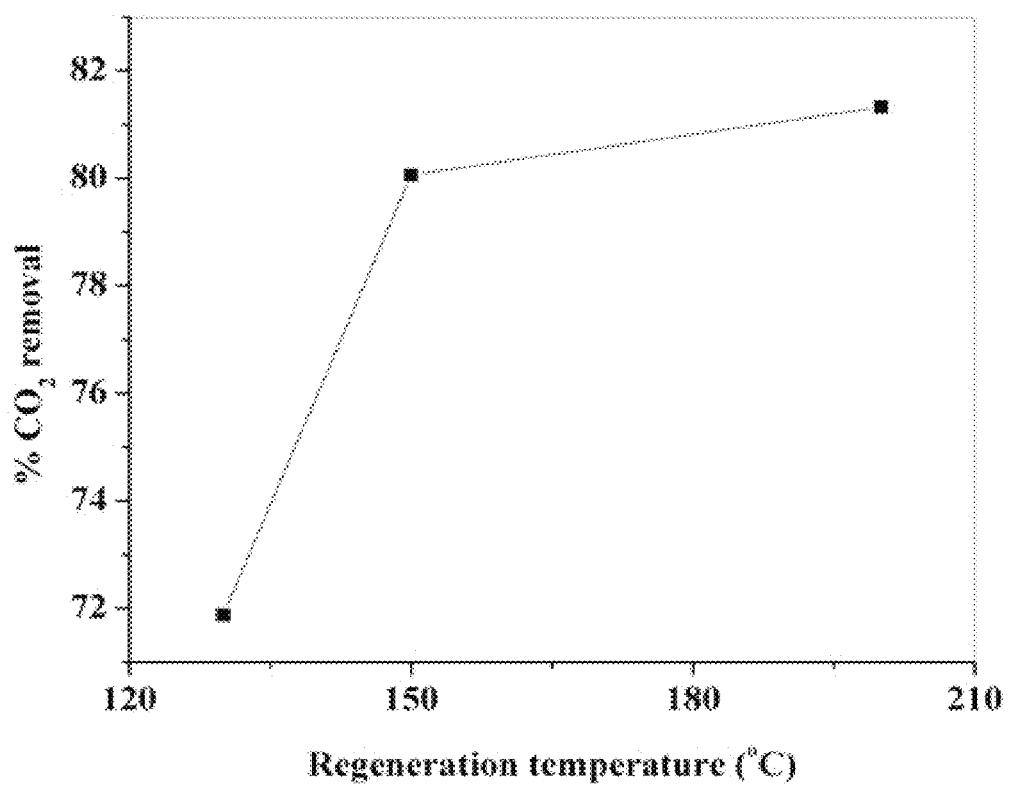
FIG. 6 is a graph of variation in carbon-dioxide ($CO_2$) removal (in percentage) versus variation in desorption temperature in accordance with the present disclosure.

FIG. 6 depicts that the removal of carbon-dioxide ($CO_2$) at a desorption temperature of 130° C. is 71.87%, while it increased to 81.33% at a desorption temperature of 200° C.

Inference—

From FIG. 6, it can be inferred that, with increase in the desorption temperature, the removal of carbon-dioxide ($CO_2$) from the gas stream is increased. It can also be inferred that, with increase in the desorption temperature from 150° C. to 200° C.; the removal of carbon-dioxide ($CO_2$) did not change significantly. Hence, 150° C. can be considered as an optimum temperature for desorption.

Experiment 3

Figure 7:
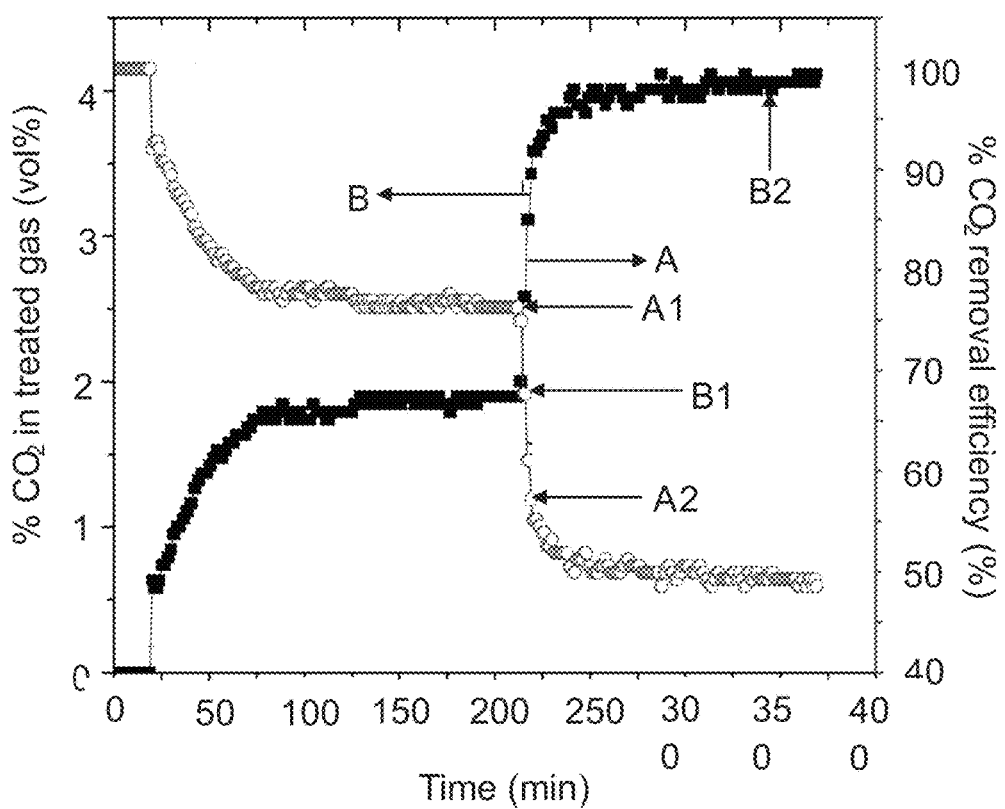
FIG. 7 is a graph of variation in efficiency of carbon-dioxide ($CO_2$) removal as a function of time and variation in percentage of carbon-dioxide ($CO_2$) in treated gas as a function of time in accordance with the present disclosure.

Effect of Different Fluids on the Efficiency of Removal of Carbon-dioxide ($CO_2$) from the Carbon-dioxide ($CO_2$) Laden Adsorbent The process described in the above mentioned experiments was carried out at an adsorption temperature of 75° C., at a desorption temperature of 150° C., and for a time period of 6 hours. The composition of the gas stream entering the adsorber (102) was 8.47 vol % carbon-dioxide ($CO_2$), 13.06 vol % water-vapor ($H_2O$), and rest vol % nitrogen ($N_2$). The velocity of the gas stream entering the adsorber and the velocity of the fluid comprising carbon-dioxide ($CO_2$) and nitrogen ($N_2$) entering the desorber (108) at a velocity of 0.7 m/s. The effect of different fluids on the efficiency of removal of carbon-dioxide ($CO_2$) (represented by curve A) from the carbon-dioxide ($CO_2$) laden adsorbent is illustrated in FIG. 7. FIG. 7 also depicts the effect of different fluids on the amount (%) of carbon-dioxide ($CO_2$) in the treated gas (represented by curve B).

Following are the technical features illustrated in FIG. 7:
a) the efficiency of carbon-dioxide ($CO_2$) removal from the carbon-dioxide ($CO_2$) laden adsorbent using nitrogen ($N_2$) (represented by curve A1) is 76.25%;
b) the efficiency of carbon-dioxide ($CO_2$) removal from the carbon-dioxide ($CO_2$) laden adsorbent using carbon-dioxide ($CO_2$) (represented by curve A2) is 50.7%; and
c) by changing the fluid in the desorber (108) from nitrogen ($N_2$) (represented by curve B1) to carbon-dioxide ($CO_2$) (represented by curve B2), the percentage of carbon-dioxide ($CO_2$) in the treated gas increased from 2 vol % to 4.2 vol % (represented by curves B1 and B2).

Inference—

From FIG. 7, it can be inferred that, the efficiency of removal of carbon-dioxide ($CO_2$) from the carbon-dioxide ($CO_2$) laden adsorbent using nitrogen ($N_2$) is more than that obtained using carbon-dioxide ($CO_2$). This is because, using carbon-dioxide ($CO_2$), the concentration gradient of carbon-dioxide ($CO_2$) at the solid (adsorbent)-gas interface is reduced.

Experiment 4

Effect of the Water-vapor ($H_2O$) Content in the Gas Stream on the Efficiency of Removal of Carbon-dioxide ($CO_2$)

The process described in the above mentioned experiments was carried out at an adsorption temperature of 80° C. and at a desorption temperature of 150° C. The circulation rate of the activated adsorbent and the partially regenerated adsorbent in the desorber (108) and the adsorber (102) respectively, was 40 kg/hr.

The temperature controlled gas saturator or the bubbler (B) was introduced into the system to facilitate better control of the supply of water-vapor ($H_2O$) for the adsorption of carbon-dioxide ($CO_2$) in the adsorber (102). The gas stream comprising water-vapor ($H_2O$), carbon-dioxide ($CO_2$) and nitrogen ($N_2$) was passed through the gas saturator to saturate the gas stream with water-vapor ($H_2O$). The water-vapor ($H_2O$) content in the gas stream was varied by changing the temperature of the gas saturator, and its effect on the efficiency of removal of carbon-dioxide ($CO_2$) is illustrated in FIG. 8.

Figure 8:
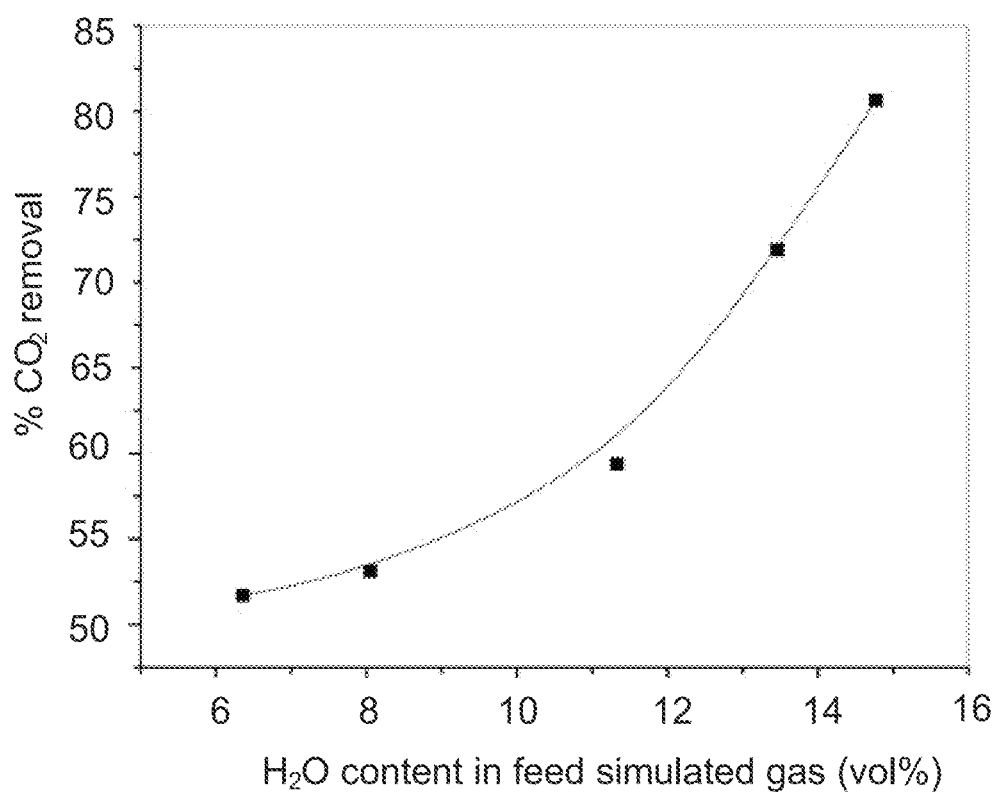
FIG. 8 is a graph of variation in carbon-dioxide ($CO_2$) removal in percentage as a function of concentration of water-vapor ($H_2O$) in the gas stream in accordance with the present disclosure.

FIG. 8 depicts that with 6.36 vol % of water-vapor ($H_2O$) in the gas stream, the efficiency of carbon-dioxide ($CO_2$) removal is 51.7%, whereas, with 14.77 vol % of water-vapor ($H_2O$), the efficiency of carbon-dioxide ($CO_2$) removal is 80.6%.

Inference—

From FIG. 8, it can be inferred that, with increase in the concentration of water-vapor ($H_2O$) in the gas stream, the efficiency of carbon-dioxide ($CO_2$) removal increases.

Figure 9:
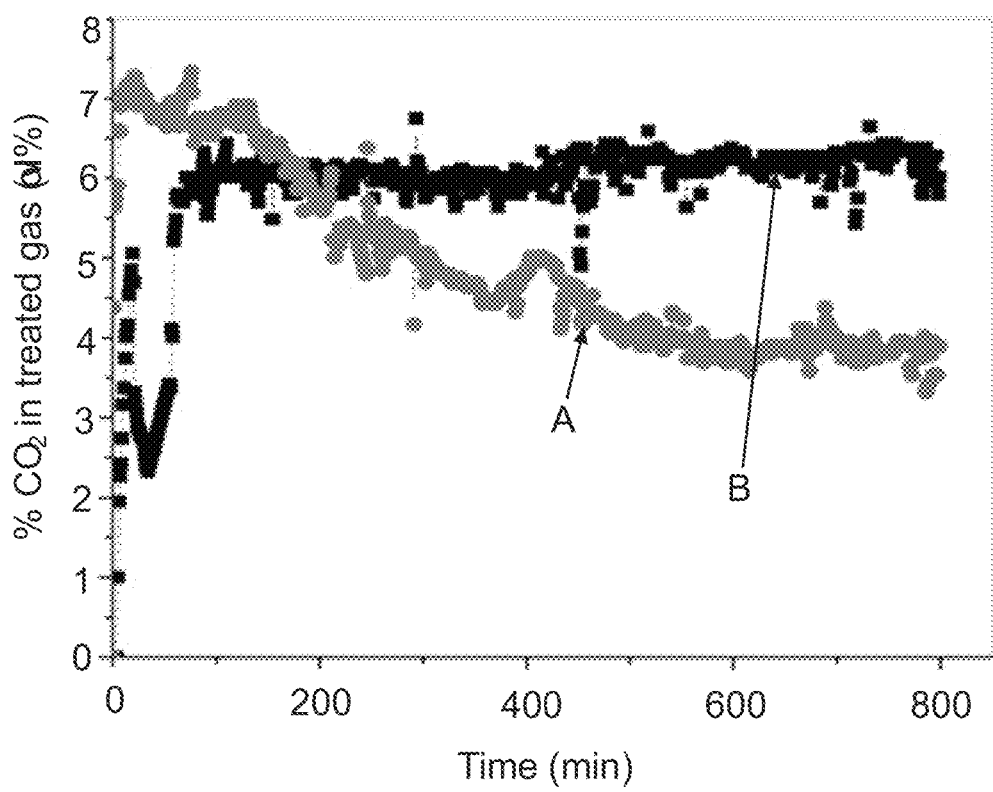
FIG. 9 is a graph of variation in percentage of carbon-dioxide ($CO_2$) in a treated gas as a function of time in accordance with the present disclosure.

Moreover, the effect of the water-vapor ($H_2O$) content in the gas stream on the amount or concentration of the carbon-dioxide ($CO_2$) in the treated gas is illustrated in FIG. 9.

It can be concluded from FIG. 9 that, with increase in the concentration of the water-vapor ($H_2O$) content in the gas stream, the concentration of the carbon-dioxide ($CO_2$) in the treated gas leaving the adsorber (102) decreases (curve A represents higher concentration or content of the water-vapor ($H_2O$) in the gas stream than curve B).

Experiment 5

Effect of Direct Steam Injection on the Efficiency of Adsorption of the Carbon-dioxide ($CO_2$)

In order to activate the adsorbent, the steam generated from a steam generator (SG, as shown in FIG. 1B) was introduced into the adsorber (102) with a high precision metering pump at a temperature of 130° C. and at a pressure of 1.7 bar for activating the adsorbent.

The residence time of the activated adsorbent and the carbon-dioxide ($CO_2$) laden adsorbent in the adsorber and the desorber was 7.3 minutes and 3.6 minutes respectively. The circulation rate of the activated adsorbent and the partially regenerated adsorbent in the desorber and the adsorber respectively, was 40 kg/hr.

After activating the adsorbent, the process described in the above mentioned experiments was carried out:

at an adsorption temperature of 80° C.;
at a desorption temperature of 150° C.; and
by injecting the gas stream having the ratio of water-vapor ($H_2O$) and carbon-dioxide ($CO_2$) as 1.67 and 1.14.

It was observed that, for the gas stream having the ratio of water-vapor ($H_2O$) and carbon-dioxide ($CO_2$) as 1.67, the efficiency of adsorption of the carbon-dioxide ($CO_2$) was 58.3%, whereas, for the ratio of 1.14, the efficiency of adsorption of the carbon-dioxide ($CO_2$) was 31.3%.

It was found that, due to the condensation of the steam in the adsorber (102), and the hygroscopic nature of the adsorbent, the percentage of removal of the carbon-dioxide ($CO_2$) in both the cases (i.e., ratio of 1.67 and 1.14) was less.

Further, it was also found that, the condensation of the steam in the adsorber (102), and the hygroscopic nature of the adsorbent cumulatively leads to difficulty which is critical for continuous circulation of the adsorbent.

TECHNICAL ADVANCES AND ECONOMICAL SIGNIFICANCE

The present disclosure described herein above has several technical advantages including, but not limited to, the realization of a process that:
- captures carbon-dioxide ($CO_2$) from a gas stream efficiently;
- partially regenerates the adsorbent, thereby reducing the energy consumption of the entire process;
- is carried out at a higher temperature;
- is carried out at a lower temperature differential between adsorption and desorption;
- reduces the overall energy demand; and
- requires lower $H_2O/CO_2$ ratio.

The disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A process for capturing carbon-dioxide from a gas stream, said process comprising the following steps:
    a) providing a support, wherein said support is one of an alumina support and a silica alumina support;
    b) impregnating potassium carbonate ($K_2CO_3$) on said support to form an adsorbent comprising potassium carbonate ($K_2CO_3$) impregnated support;
    c) activating said adsorbent in an adsorber by passing one of water-vapor and a gas stream comprising water-vapor at a temperature ranging from 40° C. to 80° C., at a pressure ranging from 1 bar to 2 bar, and for a time period ranging from 1 minute to 20 minutes to form an activated adsorbent with active adsorption sites having reduced energies compared to non-hydrated sites on the adsorbent;
    d) passing said gas stream through said adsorber containing said activated adsorbent to enable adsorption of the carbon-dioxide from said gas stream on said activated adsorbent at a temperature ranging from 40° C. to 90° C. and at a pressure ranging from 1 bar to 2 bar to form a carbon-dioxide laden adsorbent;
    e) transferring said carbon-dioxide laden adsorbent to a desorber; and
    f) passing a carbon-dioxide deficient stream through said desorber for at least partially desorbing the carbon-dioxide from said carbon-dioxide laden adsorbent at a temperature ranging from 110° C. to 200° C. and at a pressure ranging from 1 bar to 2 bar to obtain a partially regenerated adsorbent, wherein said carbon-dioxide deficient stream comprises nitrogen, carbon-dioxide, or water-vapor; and
    g) returning said partially regenerated adsorbent to said adsorber for adsorbing the carbon-dioxide from said gas stream;
    Wherein,
    the process of impregnation is carried out in the following steps:
        i. treating said support at a temperature in the range of 550° C. to 1100° C. to obtain a treated support;
        ii. adding said treated support into a fluid medium comprising $K_2CO_3$ in the range of 5 wt % to 60 wt % using an incipient wet impregnation method at a temperature in the range of 20° C. to 50° C.; and
        iii. allowing $K_2CO_3$ to disperse on said treated support for a time period in the range of 10 min to 20 min to form the adsorbent followed by drying at a temperature in the range of 100° C. to 150° C. for at a time period in the range of 10 hours to 12 hours.

2. The process as claimed in claim 1, wherein said activated adsorbent is hydrated $K_2CO_3$.

3. The process as claimed in claim 1, wherein the amount of $K_2CO_3$ in said support ranges from 5 wt % to 60 wt %.

4. The process as claimed in claim 1, wherein the support comprises a surface area in the range of 170 to 550 m²/g; pore volume in the range of 0.18 cm³/g to 0.95 cm³/g; and pore size in the range of 100 Å to 300 Å.

5. The process as claimed in claim 1, wherein the process step (d) of adsorption is carried out in said adsorber and the process step (f) of desorption is carried out in said desorber in a circulating fluidized bed bubbling flow regime.

6. The process as claimed in claim 1, wherein the differential temperature between the process step (d) of adsorption and the process step (f) of desorption ranges from 20° C. to 110° C.

7. The process as claimed in claim 1, wherein the residence time of said:
    a) activated adsorbent in said adsorber ranges from 1 minute to 10 minutes; and
    b) carbon-dioxide laden adsorbent in said desorber ranges from 1 minute to 5 minutes.

8. The process as claimed in claim 1, wherein the efficiency of carbon-dioxide removal from said gas stream ranges from 40% to 90%.

* * * * *